United States Patent
Pesonen et al.

(10) Patent No.: US 8,988,198 B2
(45) Date of Patent: Mar. 24, 2015

(54) METHOD AND APPARATUS FOR SENSORY TAGS PROVIDING SOUND, SMELL AND HAPTIC FEEDBACK

(75) Inventors: Mika Pesonen, Sunnyvale, CA (US); Eero Aho, Tampere (FI); Jari Nikara, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 602 days.

(21) Appl. No.: 13/174,274

(22) Filed: Jun. 30, 2011

(65) Prior Publication Data

US 2013/0002405 A1      Jan. 3, 2013

(51) Int. Cl.
| | | |
|---|---|---|
| G06K 7/00 | (2006.01) | |
| H04B 5/00 | (2006.01) | |
| H04Q 9/00 | (2006.01) | |

(52) U.S. Cl.
CPC .. *H04B 5/00* (2013.01); *H04Q 9/00* (2013.01); H04Q 2209/47 (2013.01)
USPC . 340/10.4; 340/10.1; 340/10.41; 340/539.23; 340/572.1; 340/539.1

(58) Field of Classification Search
CPC ........... H04Q 2209/47; G06K 7/10297; G09B 5/062; G09B 5/06; G09B 5/00; G09B 21/00; G09B 21/001; G09B 21/003; G09B 21/007
USPC .............. 340/10.1, 10.4, 10.41, 10.51, 572.1, 340/539.1, 539.23
See application file for complete search history.

(56) References Cited

U.S. PATENT DOCUMENTS

| | | | |
|---|---|---|---|
| 2004/0264441 A1* | 12/2004 | Jalkanen et al. | 370/352 |
| 2006/0279412 A1* | 12/2006 | Holland et al. | 340/10.51 |
| 2009/0191531 A1 | 7/2009 | Saccocci | |
| 2009/0265748 A1* | 10/2009 | Dotchevski et al. | 725/109 |
| 2009/0327884 A1 | 12/2009 | Parks | |
| 2010/0019482 A1* | 1/2010 | Kumagai et al. | 283/72 |
| 2010/0283586 A1* | 11/2010 | Ikeda et al. | 340/10.42 |

FOREIGN PATENT DOCUMENTS

| | | |
|---|---|---|
| KR | 2007/0002182 | 1/2007 |
| KR | 2010/0091591 | 8/2010 |

OTHER PUBLICATIONS

Haselsteiner, Ernst and Breitfuss, Klemens; "Security in Near Field Communication (NFC)"; Philips Semiconductors, Mikronweg 1, 8101 Gratkorn, Austria 2006, pp. 1-11.
(Continued)

*Primary Examiner* — Andrew Bee
(74) *Attorney, Agent, or Firm* — Alston & Bird LLP (57) ABSTRACT

Systems and methods for creating "feelings" from tangible objects in a responsive and cost efficient manner are provided. In accordance with such systems and methods, near field communication (NFC) tags are embedded into tangible objects, e.g., Compact Discs (CDs), books, posters, etc., where the NFC tags include feeling/sensory feedback parameters associated with the object in which the NFC tag is embedded. That is, such NFC tags are able to stimulate one or more senses, such as the human senses of sight, hearing, touch, smell, and taste. Thus, sensory feedback is provided via tangible objects, where only minimal cost (e.g., a few cents) is added to the production/manufacture of such objects.

26 Claims, 8 Drawing Sheets

(56) References Cited

OTHER PUBLICATIONS

"NFC Forum Type Tags, White Paper V1.0"; NXP Semiconductors—Public; NXP B.V. Apr. 1, 2009; pp. 1-24.

Sweeney, Terry; "NTT Goes from Cell Phone to Smell Phone"; Information Week; Apr. 7, 2008; downloaded on Feb. 29, 2012 at http://www.informationweek.com/news/mobility/business/207100004.

Lee, Rueben; "Sony Ericsson's "aroma" phone"; downloaded on Feb. 29, 2012 at website: http://asia.cnet.com/crave/2007/01/18/sony-ericsson-s-aroma-phone/.

Collins, David; "Mobile Phones—Smell-O-Phone"; Ezine Articles; Downloaded on Feb. 29, 2012 at http://ezinearticles.com/?Mobile-Phones—Smell-O-Phone&id=1157105.

Hudson, Travis; "Samsung Smell-o-phone", Mar. 27, 2006; Downloaded on Feb. 29, 2012 at http://gizmodo.com/163201/samsung-smellophone.

NFC Forum Technical Specifications; pp. 1-6; Downloaded on Feb. 29, 2012 at http://www.nfc-forum.org/specs/spec_list.

"Software Synthesizer"; From Wikipedia, the free encyclopedia; pp. 1-4; Downloaded on Feb. 29, 2012 at http://en.wikipedia.org/wiki/Software_synthesizer.

McGrath, B.; McKinley, A.; Duistermaat, M.; Carlander, O.; Brill, C.; Zets, G.; and van Erp, J.B.F.; "Tactile Actuator Technology"; R&T Organization, Chapter 4; pp. 1-12; Downloaded on Feb. 29, 2012 at http://ftp.rta.nato.int/public/PubFullText/RTO/TR/RTO-TR-HFM-122/TR-HFM-122-04.pdf.

International Search Report; Written Opinion of the International Searching Authority; PCT/FI2012/050486; dated Aug. 27, 2012.

Office Action for Korean Application No. 2014-7002417 dated Sep. 23, 2014.

\* cited by examiner

METHOD AND APPARATUS FOR SENSORY TAGS PROVIDING SOUND, SMELL AND HAPTIC FEEDBACK

TECHNICAL FIELD

The present application relates generally to sensory feedback in electronic devices and, more particularly, to tags, such as, e.g., near field communication (NFC) tags that provide sound, smell, and/or haptic feedback to a user.

BACKGROUND

Wireless or cellular service providers as well as device manufacturers are continually challegened to deliver value and convenience to consumers by providing, e.g., compelling services, applications, and/or content. One area of development relates to the integration of digital information and services with tangible objects, such as printed media, clothing, various physical products, etc. Historically, producers and manufacturers of such tangible objects have not been able to take advantage of the growing availability of digital information. However, with the development of low-cost radio frequency (RF) memory tags that can be associated with an object, digital information can be linked to any object tagged with such an RF memory tag.

In addition to RF memory tags, further development has revolved around near field communication (NFC) Forum type tags that may be incorporated into/associated with tangible objects. The NCF Forum is an industry consortium geared to further developing and improving NFC technology. Based on NFC technology, the NFC Forum created the NFC Data Exchange Format (NDEF) and the NFC Forum type tag operation, where NDEF refers to a data format utilized for encapsulating and identifying application data exchanged between NFC-enabled devices.

An NFC device may refer to various electronic devices, such as mobile telephones, Personal Digital Assistants (PDAs), personal computers (PCs), or any other suitable electronic device. An NFC tag may refer to a particular type of contactless card/tag that is able to store NDEF-formatted data and is compatible with one of four currently implemented NFC Forum tag platforms, i.e., Type 1 tags, Type 2 tags, Type 3 tags, and Type 4 tags. The various tag types may differ in terms of memory size, communication speed, and/or read/write/re-write capabilities. For example, a Type 1 tag may have a memory size of 96 bytes (expandable to 2 kbytes), read and re-write capabilities (and user-configurable to be read-only), and have a communication speed of 106 kbits/s. Type 4 tags, in contrast, may have a variable memory size ranging from 4 kbytes to 32 kbytes, are pre-configured by the manufacturer to be read and re-writable or read-only, and communicate at speeds of up to 424 kbits/s.

Application dat is typically stored inside an NFC tag by first encapsulating the application data into an NDEF message, and second, into the data structure specified by the NFC Forum Type tag platform. The NDEF message and platform identify the type of application data, e.g., Uniform Resource Locator (URL), v-Card, or image, etc., stored on the NFC tag. In operation, for example, a user may "touch" his/her mobile telephone to an object containing an NFC tag, such as a business card embedded with an NFC tag. The mobile telephone may then read the NFC tag and retrieve and save v-Card information stored on the NFC tag. Other currently-implemented uses for NFC tags include, e.g., retrieval of a web page link from the NFC tag, or establishing a Bluetooth connection to enable data transfer via a direct connection/link. In this case, the Bluetooth link is established by bringing an NFC device in close proximity to another NFC device, and using NFC to pair the devices. However, larger amounts of data may not be transferred over an NFC connection since the NFC bandwidth is too slow for transferring large data amounts, hence the use of the Bluetooth connection.

Certain drawbacks arise in the context of NFC tags as currently/conventionally implemented. For example, in a scenario where a URL is stored in an NFC tag, other additional connections are required, e.g., to access the Internet, or in the case of the aforementioned Bluetooth scenario, to another NFC device. Moreover, current implementations are not able to ensure that the desired content supposedly associated with the URL is actually still available. Further still, delays associated with such scenarios are simply too long for a positive user experience.

Additionally, NFC tags as currently implemented and/or envisioned are not able to provide sensory feedback (e.g., sight, hearing, touch, smell, and taste) or "feelings" associated with objects in a cost efficient and responsive manner. That is, current and conventional implementations of NFC tags fail to take advantage of the ever-improving audio speakers that are being implemented in electronic devices, haptic displays, and smell circuits. Furthermore, and in addition to the aforementioned lack of NFC bandwidth for large amounts of data, current NFC tags are too small to even store large audio clips or haptic touch maps.

SUMMARY

Various aspects of examples of the invention are set out in the claims.

According to a first aspect, a method comprises detecting a memory tag embedded within an object; loading program code and at least one sensory parameter from the memory tag; and generating sensory feedback in accordance with the loaded program code and the at least one sensory parameter, wherein the sensory feedback reflects content of the object.

According to a second aspect, a computer-readable memory includes computer executable instructions, the computer executable instructions, which when executed by a processor, cause an apparatus to detect a memory tag embedded within an object; load program code and at least one sensory parameter from the memory tag; and generate sensory feedback in accordance with the loaded program code and the at least one sensory parameter, wherein the sensory feedback reflects content of the object.

According to a third aspect, an apparatus comprises at least one processor and at least one memory. The at least one memory includes computer program code, the at least one memory and the computer program code configured to, with the at least one processor, cause the apparatus to perform at least the following: detect a memory tag embedded within an object; load program code and at least one sensory parameter from the memory tag; and generate sensory feedback in accordance with the loaded program code and the at least one sensory parameter, wherein the sensory feedback reflects content of the object.

According to a fourth aspect, a method comprises receiving at least one of a user input parameter and a device input parameter; receiving at least one sensory feedback parameter; storing, in a compressed format, the at least one of the user input parameter and the device input parameter, and the at least one sensory feedback parameter in conjunction with a program code, the program code being configured to, upon execution, output sensory feedback reflective of content of an object.

According to a fifth aspect, a computer-readable memory includes computer executable instructions, the computer executable instructions, which when executed by a processor, cause an apparatus to receive at least one of a user input parameter and a device input parameter; receive at least one sensory feedback parameter; and store, in a compressed format, the at least one of the user input parameter and the device input parameter, and the at least one sensory feedback parameter in conjunction with a program code, the program code being configured to, upon execution, output sensory feedback reflective of content of an object.

According to a sixth aspect, an apparatus comprises at least one processor and at least one memory. The at least one memory includes computer program code, the at least one memory and the computer program code configured to, with the at least one processor, cause the apparatus to perform at least the following: receive at least one of a user input parameter and a device input parameter; receive at least one sensory feedback parameter; and store, in a compressed format, the at least one of the user input parameter and the device input parameter, and the at least one sensory feedback parameter in conjunction with a program code, the program code being configured to, upon execution, output sensory feedback reflective of content of an object.

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

Example embodiments and their potential advantages are understood by referring to FIGS. 1-7 of the drawings.

Various embodiments are directed to creating "feelings" from tangible objects in a responsive and cost efficient manner. In particular, NFC tags are embedded into tangible objects, e.g., Compact Discs (CDs), books, posters, etc., where the NFC tags include feeling/sensory feedback parameters associated with the object in which the NFC tag is embedded. That is, NFC tags in accordance with various embodiments, are able to stimulate one or more senses, such as the human senses of sight, hearing, touch, smell, and taste. Thus, sensory feedback is provided via tangible objects, where only minimal cost (e.g., a few cents) is added to the production/manufacture of such objects.

Although various embodiments may incorporate visual, audio, or haptic or tactile feedback technology that has already been developed, as well as smell circuits that are currently being developed, the various embodiments are not limited to these senses. That is, various embodiments contemplate incorporating any sense(s) that can be translated into data/parameters that may be stored on an NFC tag, e.g., taste, balance and acceleration, temperature, pain, etc. It should also be noted that various embodiments are not limited to NFC tags, but any suitable contactless or other type of memory tag that may be used to provide sensory feedback.

As described previously, current/conventional NFC tags lack the capacity necessary for storing larger audio clips or haptic touch maps. For example, a one minute MP3 compressed audio clip encoded at a 128 Kbit/s bitrate results in a 960 kb file, while storing a static 8-bit haptic map with a WVGA resolution of 800×480 results in a 384 kb file. Additionally, data transfer times for large amounts of data using NFC technology may fall into the ten second or greater range.

Figure 1:
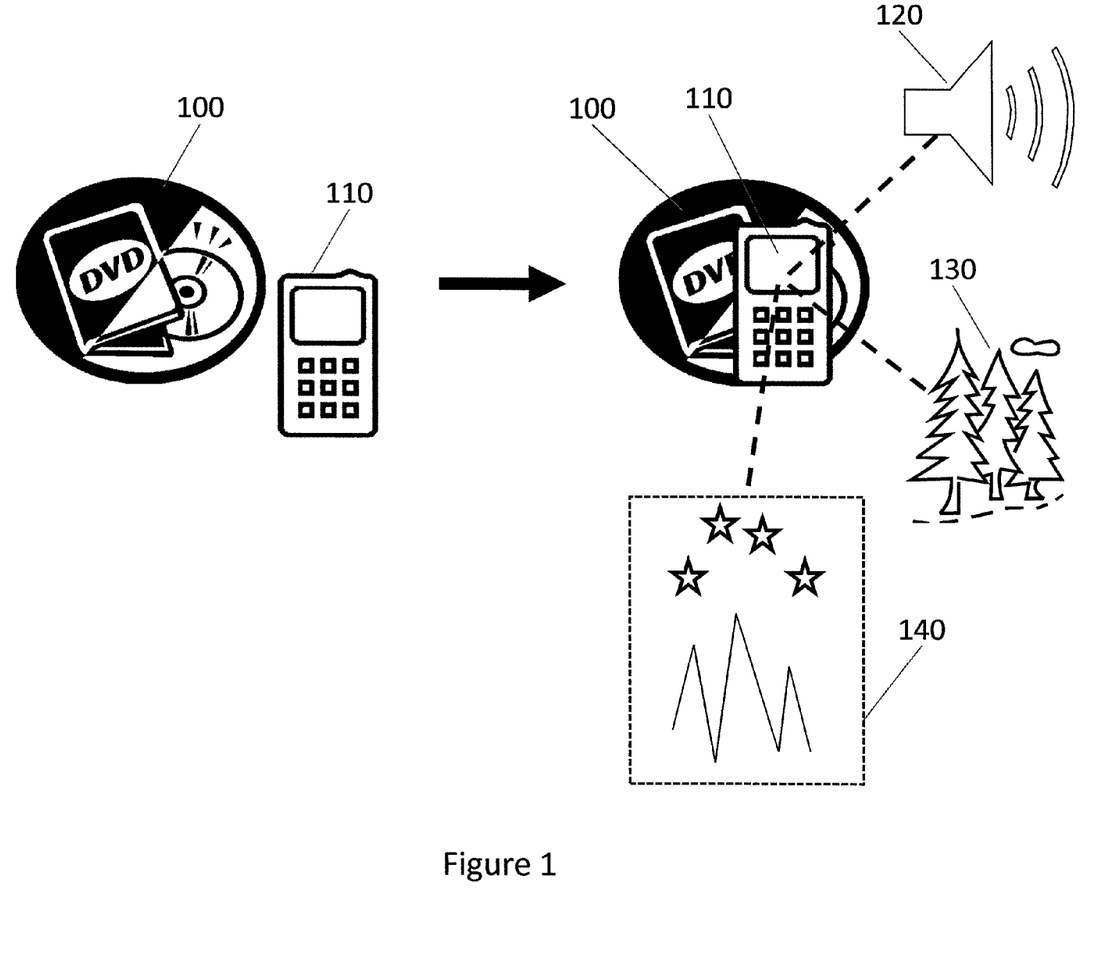
FIG. 1 illustrates an example system architecture for providing sensory feedback.

FIG. 1 illustrates an exemplary system architecture in accordance with various embodiments. Included in the exemplary system architecture are a tangible object 100, such as a Digital Video/Versatile Disc (DVD) and a DVD storage case, and an electronic device 110, such as a mobile telephone. One or more memory tags, such as an NFC tag may be embedded in the DVD itself and/or the DVD storage case. As will be discussed in greater detail below, the one or more NFC tags provide sensory feedback to a user of the mobile telephone 110 when the user touches or brings the mobile telephone 110 in close proximity to the tangible object 100. As a result, the user is able to experience, in this example, audio feedback 120, olfactory feedback 130, and haptics 140. For example, if the DVD has stored thereon a movie, the audio feedback 120 may be embodied by the movie's theme music. If the DVD has stored therein, a movie about Robin Hood, the NFC tag(s) may provide the olfactory feedback in the form of a forest smell. If the DVD has stored thereon, the Ice Age® movie, the NFC tag(s) may provide haptics 140 in the form of the feeling of sharp objects and/or falling snowflakes.

Figure 2:
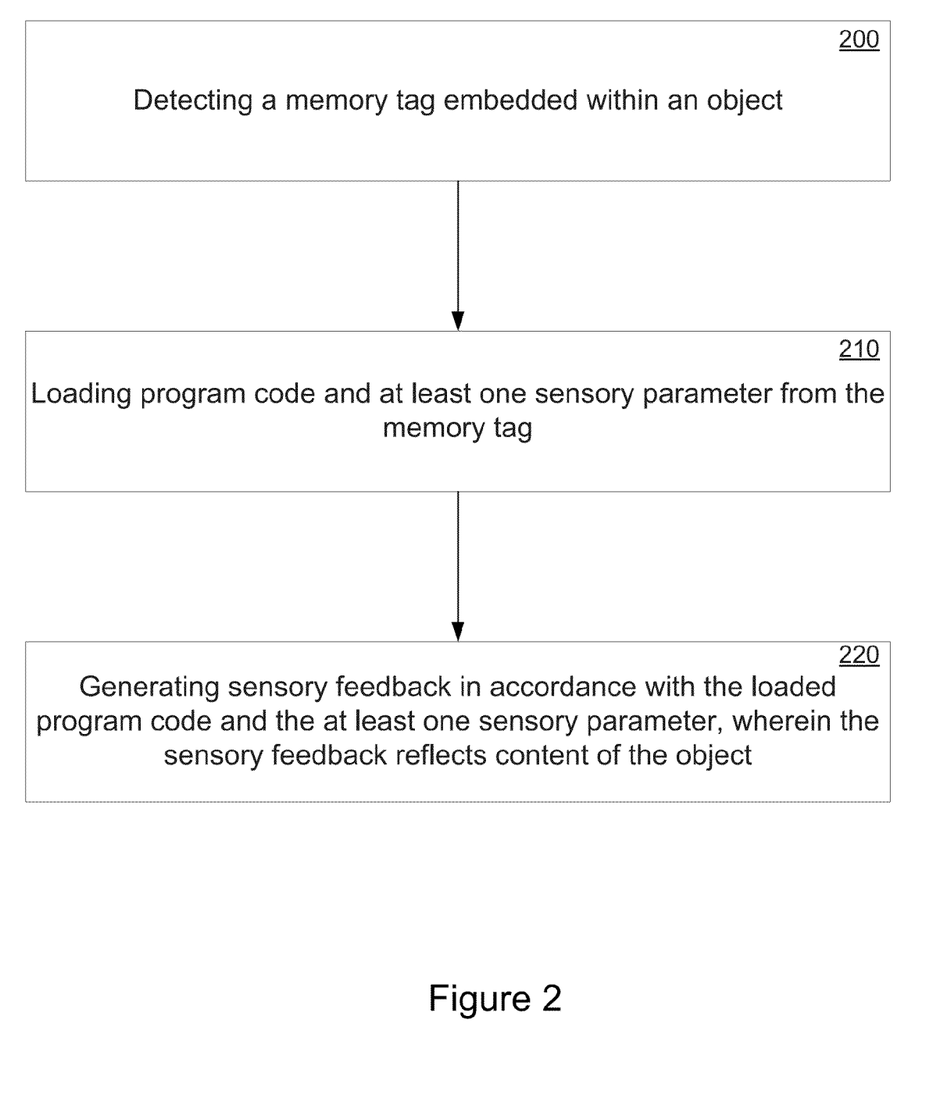
FIG. 2 is a flow chart representative of exemplary processes performed for providing sensory feedback in accordance with various embodiments.

FIG. 2 is a flow chart representative of exemplary processes performed for providing sensory feedback in accordance with various embodiments. At 200, a memory tag embedded within an object is detected. For example, a user may touch the object, such as a CD, DVD, poster, etc. with a user device, such as a mobile telephone, PDA, PC, or other electronic device. Alternatively, the user may simply bring or move the user device in close proximity to the object. When the user device and object touch or are in sufficient proximity to each other, the user device is able to detect the memory tag, such as an NFC tag. At 210, the NFC tag, upon which program code and at least one sensory parameter is stored, is loaded into the user device. At 220, sensory feedback such as the aforementioned haptics, smell, audio, etc. is generated in accordance with the loaded program code and the at least one sensory parameter. The sensory feedback is reflective or indicative of the object's content. For example, paper-based coupon inserts may have NFC tags embedded therein, such that when a user moves his/her mobile telephone over a coupon for a particular food item, the user receives sensory feedback in the form of the odor of the particular food item, such as chocolate chip cookies.

Different types of sensory feedback may be generated in accordance with various embodiments using input parameters along with, e.g., update intervals that can be adjusted or configured according to different needs. For example, it may be desired to convey a a sense of coldness in association with a particular object. In this case, haptics that convey a sense of temperature, such as "colder" sounding music or sharper haptic feelings. In accordance with another embodiment, the NFC tag may be configured with olfactory feedback that is to be generated based on the time of day a user interacts with an object. That is, a book may be embedded with an NFC tag that stores data and parameters for generating an energizing audio and/or scent in the morning, while in the evening, the more peaceful audio and smells may be generated.

Further still, sensors may be utilized in conjunction with various embodiments. In accordance with one embodiment, one or more acceleration sensors may sense motion associated with a particular object. Depending on whether the detected motion is fast or slow, appropriate sensory feedback, such as sound or smell may be generated. Another embodiment may result in the generation of louder audio during the day as opposed to softer audio at night. Still other embodiments may result in adjusting visual, audio, haptics, and smell feedback in accordance with the touching of a device screen, or adjusting microphone levels depending on a particular environment. Additionally, any sensory feedback may be adjusted in accordance with the capabilities of a particular user device. For example, a user device operating in an energy efficient mode may have haptics updated less frequently than in a user device operating at full power.

As alluded to previously, NFC tags are capable of storing URL such that upon detecting an NFC tag in an object, the user device retrieves the stored URL and presents it to the user. The user may then select the URL and begin web browsing. However, unlike conventional NFC tag implementations, various embodiments provide for the ability to also retrieve sensory feedback from the Web and provided to the user and/or used in conjunction with other sensory feedback specified in the NFC tag as already described above.

Figure 3:
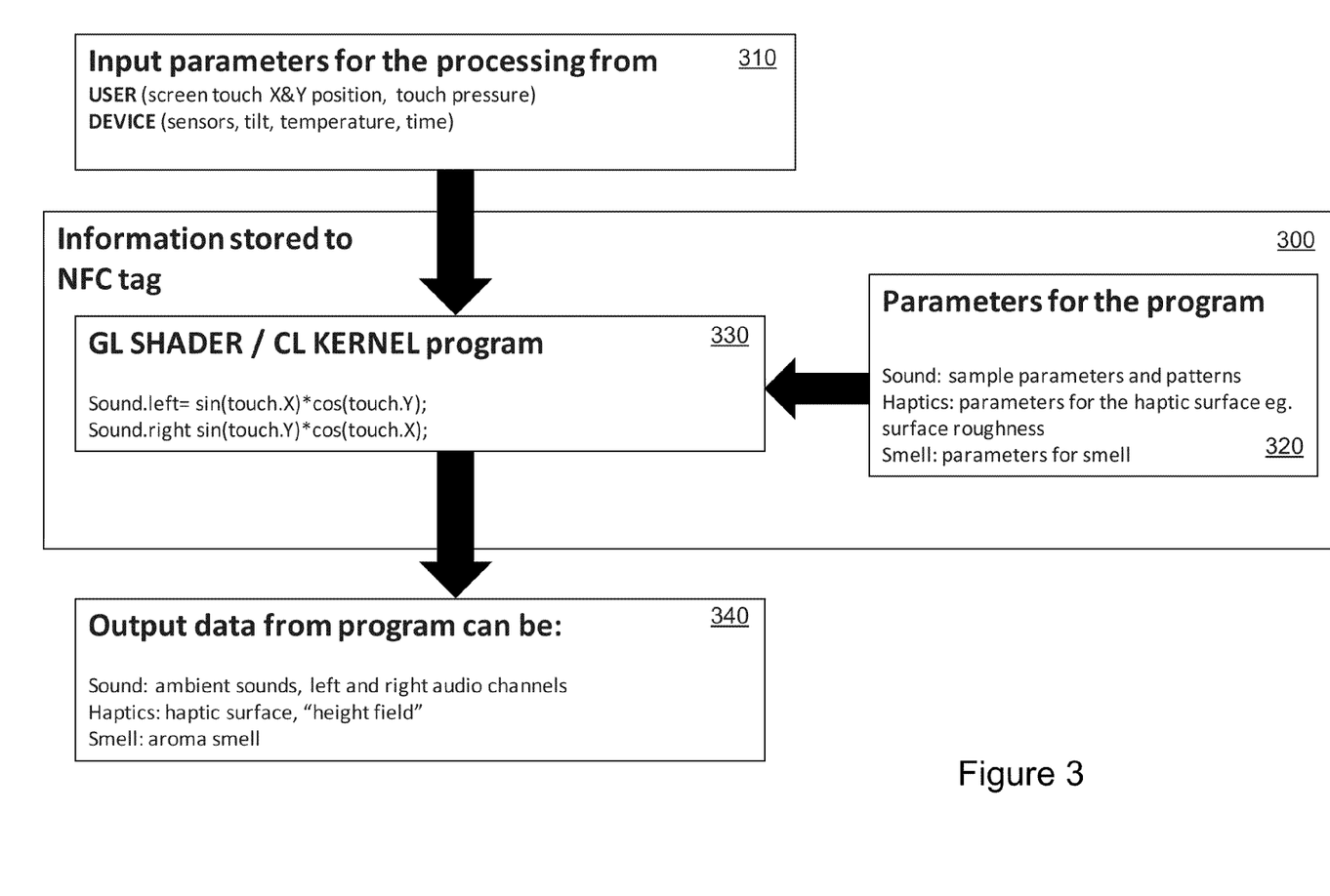
FIG. 3 illustrates an example of a sensory NFC tag, and related method of configuring the sensory NFC tag.

FIG. 3 illustrates an exemplary NFC tag 300 configured in accordance with various embodiments for generating sensory feedback, and a method of configuring the NFC tag 300. The NFC tag 300 accepts/receives input parameters 310 for processing from, e.g., a user and/or a user device. For example, input parameters 310 received from a user may include, but is not limited to screen touches, relative (X/Y) position, and touch pressure. Input parameters that may be received from a user device include parameters received from, e.g., sensors, such as the acceleration sensors described above, as well as tilt, temperature, and time parameters associated with/or sensed at the user device.

Program parameters 320 may also be stored in/received at the NFC tag 300. The program parameters 320 may include, e.g., sample parameters and patterns associated with sound feedback, haptic surface parameters/maps associated with a haptics that are to be generated, and olfactory parameters for smell feedback. As illustrated in FIG. 3, input and program parameters 310 and 320, respectively, may be stored in/received at the NFC tag 300. In turn, program code/source code 330 utilizes the input and program parameters 310 and 320 to create output data 340, e.g., the desired sensory feedback, such as a particular sound(s), haptics, and/or smell. The code format of the program code/source code 330 may be a high level shading language, such as the OpenGL shader language referred to as GL Shader Language (GLSL) or kernel functions using, e.g., the Open Computing Language (OpenCL).

In contrast to conventional NFC tag implementations, the program source code and program parameters are stored in NFC tag using only a few kilobytes of data. To achieve this minimal data storage amount, the source code and parameters may be compressed using an appropriate file compression/decompression software/algorithm, such as, e.g., the GNU Project's GNU zip (gzip) program. Additionally, it should be noted that Javascript code is supported in NFC tags as a media type identifier.

Again, the program source code and program parameters are transferred from the NFC tag to the user device when the user touches the object embedded with the NFC tag or brings the user device in close proximity to the object. Upon the transfer of the program source code and parameters to the user device, the program source code may be compiled using any suitable application programming interfaces (APIs), preferably high performance APIs. For example, the OpenGL for Embedded Systems (ES) API, the OpenCL API, or the WebGL API may be used to compile the transferred program source code in the user device. Alternatively, and to execute programs without the need for compilation, embodiments may utilize interpreters for interpreted languages such as, e.g., Python or Javascript. It should be noted that with program source presentation, binary compatibility is not an issue. It should also be noted that implementation of various embodiments are not limited to merely those types of program source code and/or APIs explicitly discussed herein, as any format (e.g., code and corresponding API/interpreter/etc.) may be utilized so long as the user device is capable of understanding the format, although naturally known code formats may be standardized to avoid any fragmentation.

In the user device, the program source code is executed using user data (e.g., touch position, time, etc.) alone or in conjunction with device data (e.g., time, tilt, temperature, acceleration sensor data, etc.) to generate corresponding ambient sounds, haptics, and smell based on the parameters stored in the NFC tag. As indicated previously, one or more NFC tags may be utilized in an object. Different NFC tags may produce different sensory feedback to a user to achieve, e.g., a desired mood, theme, or feeling associated with the object.

In accordance with embodiments where auditory feedback is to be generated, it should be noted that sound clips can be generated from, e.g., "softsynth" programs. The NFC tag stores soft synthesizer code that outputs audio samples. For example, sounds and music can be created with an Attack-Decay-Sustain-Release (ADSR) synthesizer mixed with low/high pass filters.

In embodiments where haptics are to be generated, a haptic map may be used to represent a surface "roughness" of a display, i.e., a height of the surface at a sub-millimeter level. Haptics may also simulate other types of touch-related senses, e.g., temperature or vibration, without a need for physically touching or having a physical connection to an object. Haptic feedback is given to user when the user slides a finger on top of the display surface. Such haptic feedback may be generated using actuators, vibrators, electro-tactile haptic interfaces, or any other suitable interface provided or utilized by a user device.

Figure 4A:
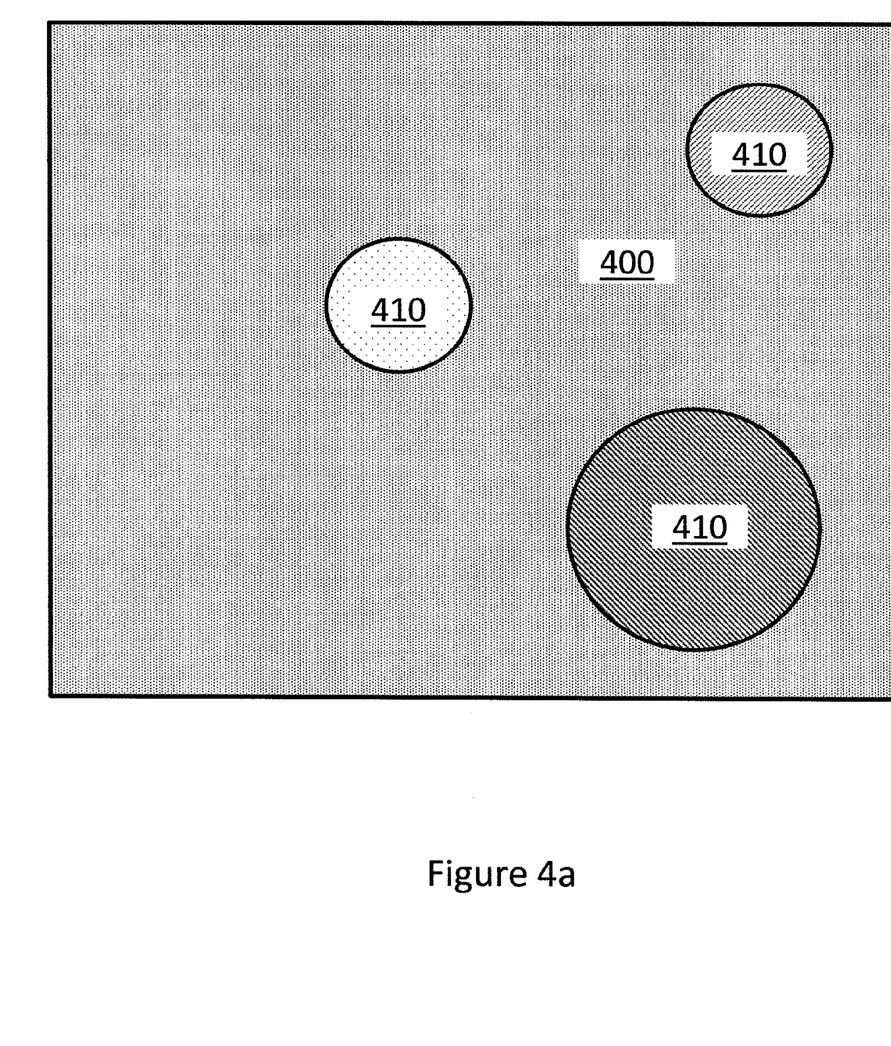
FIGS. 4a and 4b illustrate a haptic example in accordance with one embodiment.
Figure 4B:
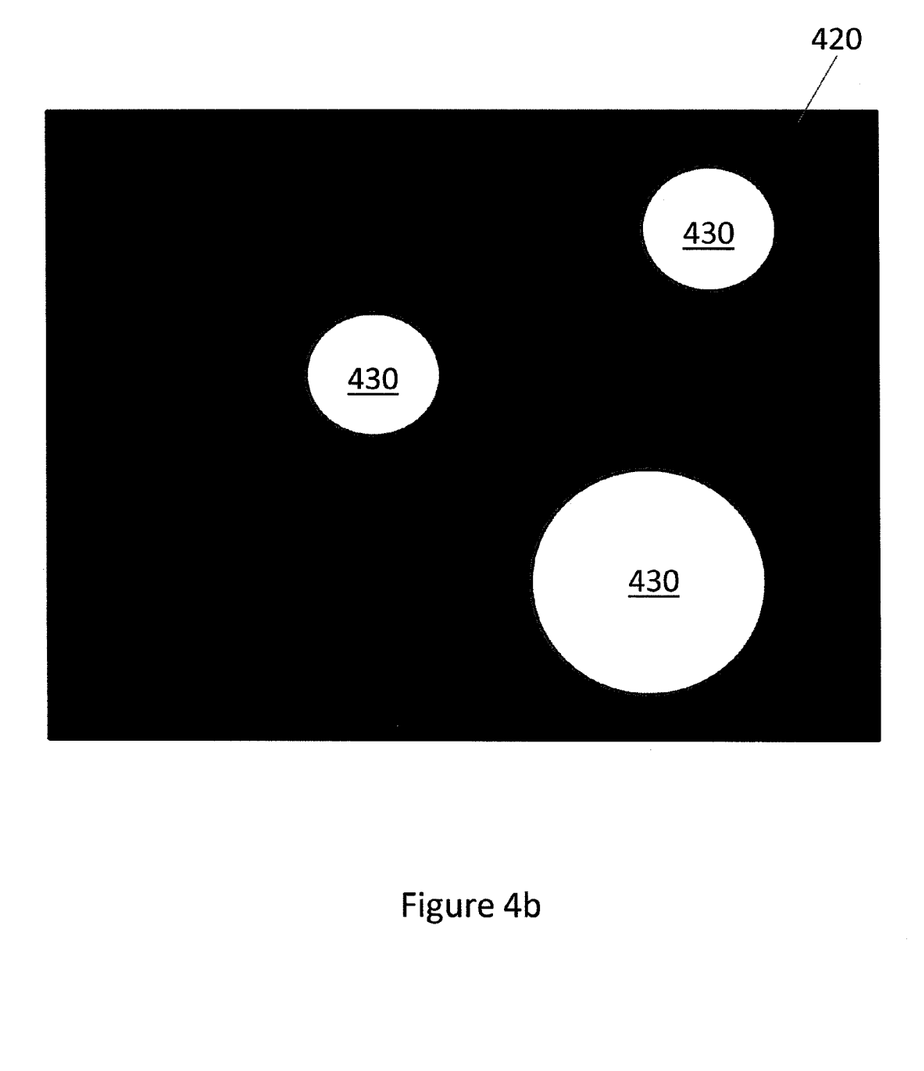

As is the case with auditory feedback, the NFC tag stores program code which generates a haptic map from the aforementioned program parameters. Output from the haptic map code may be an 8-bit height field. FIG. 4a illustrates an exemplary generated RGB color image, where the background 400 may be a first color, and the circles 410 may be a second color. FIG. 4b illustrates a corresponding haptic map version of the color image illustrated in FIG. 4a. That is, the background 420 shown in black may be assigned a value of 0 in an 8-bit range, representative of the lowest surface height. The white circles 430 may be assigned a value of 255 in the 8-bit range that represents the highest surface height of the display. Feedback is effectuated when a user's finger moves from the black background area 420 to the white circle 430 areas, where the user device's vibrator may be activated to indicate the change in surface height.

In the case of olfactory feedback, the NFC tag stores data and/or parameters indicating that a particular smell should be emitted at, e.g., a certain time, in accordance with a particular temperature, based upon a user action, etc. Currently, manufacturers have been or have already developed mobile telephones that can emit one or more smells. For example, certain mobile telephones are able to be outfitted with a scented sheet that can be attached to the back panel of the mobile phone. In accordance with one embodiment, multiple scented sheets may be attached to a user device, each of which is embedded with an NFC tag. Based upon one or more input parameters, one of the multiple scented sheets may be triggered to release its scent. Other mobile telephones in development utilize a scent chip that relates smells relative to, e.g., a user's choice of text messages. In accordance with another embodiment, one or more NFC tags store data and/or parameters that control when and/or how the scent chip releases smells.

Various embodiments allow feelings to be experienced from objects in cost efficient way using one or more sensory feedback mechanisms. For example, any recognizable sense that can be translated or generated into mathematical/synthetic content can be exploited by compressing the requisite data and storing such data on one or more memory tags, such as NFC tags. Once such data is retrieved from the one or more NFC tags, a user device may decompress the data and generate the sensory feedback, e.g., generating sound with varying quality, enabling parametric animation of feelings, etc.

Figure 5:
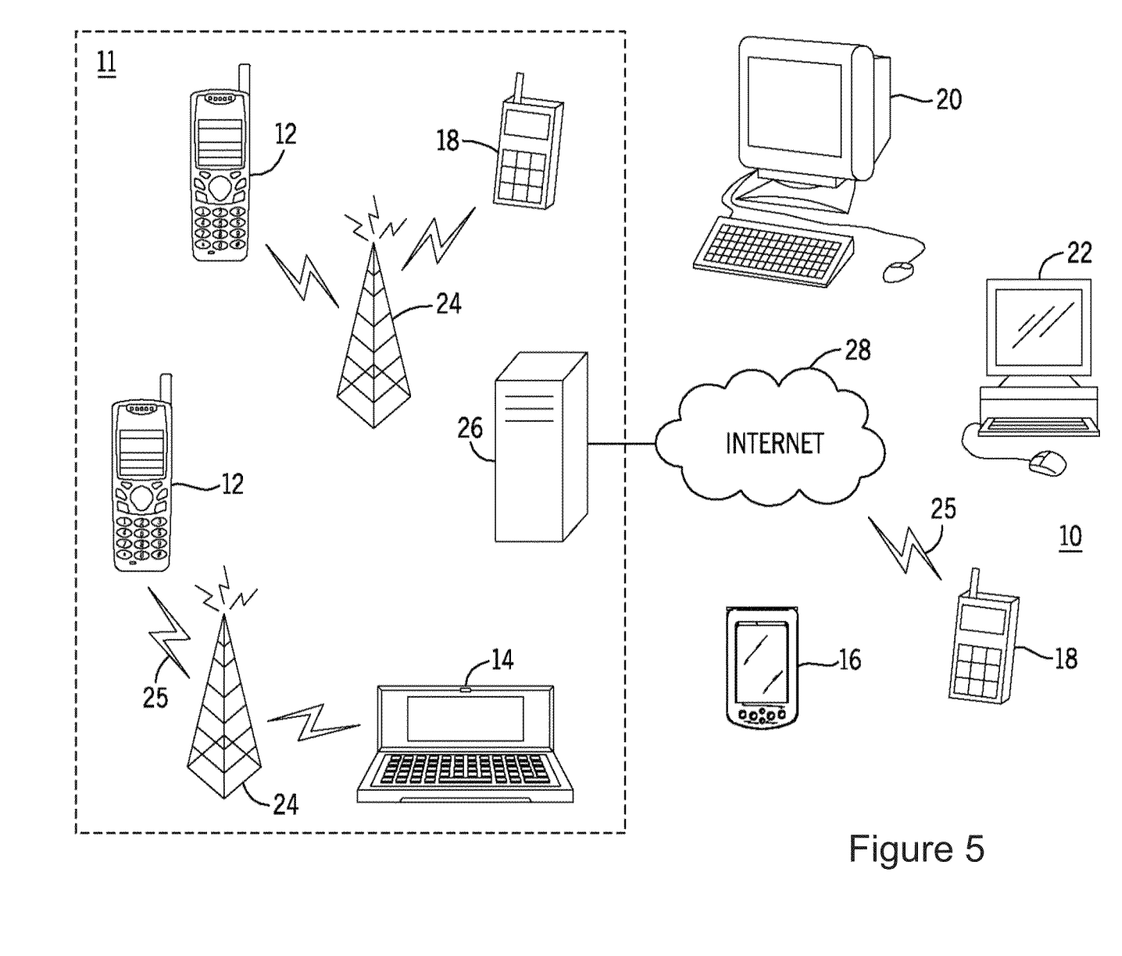
FIG. 5 is an overview diagram of a system within which various embodiments may be implemented.

FIG. 5 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic user device 12, in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 6:
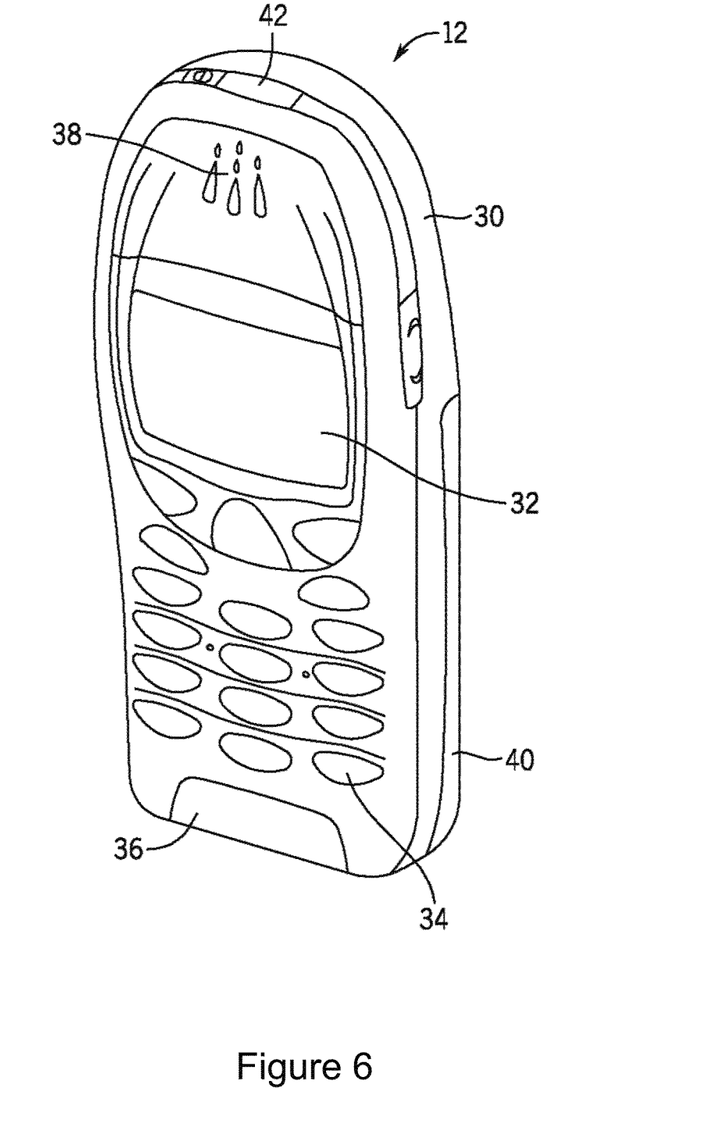
FIG. 6 is a perspective view of an electronic device that can be used in conjunction with the implementation of various embodiments.
Figure 7:
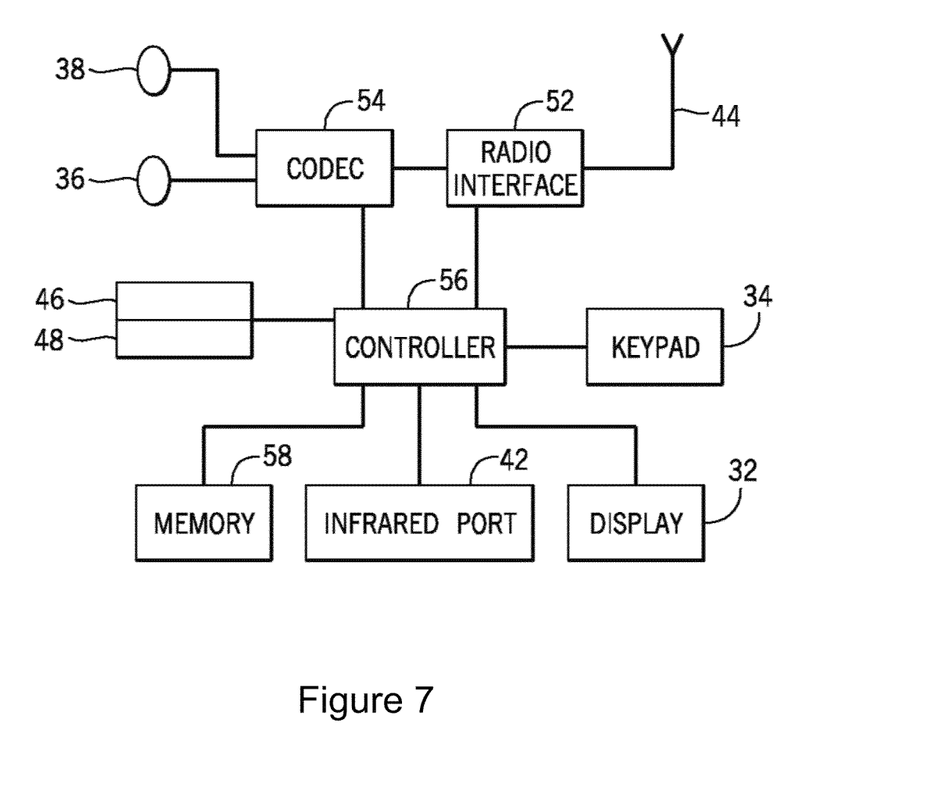
FIG. 7 is a schematic representation of the circuitry which may be included in an exemplary electronic device which may be utilized in accordance with various embodiments.

FIGS. 6 and 7 show one representative electronic device 12 within which the present invention may be implemented, where the device can detect a memory tag as described previously, and provide sensory feedback to a user in accordance with various embodiments. It should be understood, however, that the present invention is not intended to be limited to one particular type of device. The electronic device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller/processor 56 and a memory 58. The above-described components enable the electronic device to send/receive various messages to/from other devices that may reside on a network in accordance with the various embodiments of the present invention. It should be noted that the controller/processor 56 and/or another processor along with related circuitry/elements may be utilized to effectuate various embodiments by detecting NFC tags and executing program code/parameters to generate sensory feedback. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    detecting a memory tag embedded within an object;
    detecting at least one input parameter, wherein the at least one input parameter comprises at least one of motion or a time of day;
    loading program code and at least one sensory parameter from the memory tag, wherein the at least one sensory parameter comprises at least one of a haptic-related program parameter or an olfactory-related program parameter; and
    generating sensory feedback in accordance with the loaded program code, the at least one sensory parameter, and the at least one input parameter, wherein the sensory feedback reflects content of the object.

2. The method of claim 1, wherein the detecting, the loading, and the generating are performed at an electronic device upon the electronic device coming within substantially close proximity to the object.

3. The method of claim 1, wherein the memory tag comprises a near field communication tag.

4. The method of claim 1, wherein the at least one sensory parameter further comprises an auditory-related program parameter.

5. The method of claim 4, wherein the auditory-related program parameter comprises soft synthesizer code representative of a sound clip, and wherein the sensory feedback comprises an audio sample including the sound clip.

6. The method of claim 4, wherein the haptic-related program parameter comprises a haptic map representative of a surface of a display of an electronic device at which the sensory feedback is generated.

7. The method of claim 4, wherein the olfactory-related program parameter comprises a particular smell to be emitted based upon at least one of a user action, temperature, and time.

8. The method of claim 1 further comprising, retrieving a Uniform Resource Locator (URL) from the memory tag, wherein the sensory feedback is generated in accordance with the loaded program code, the at least one sensory parameter, and content identified by the URL.

9. The method of claim 1, wherein the program code and the at least one sensory parameter are stored on the memory tag in accordance with a compression algorithm.

10. The method of claim 1, wherein the generating of the sensory feedback comprises one of compiling or interpreting the program code and executing the program code utilizing the at least one sensory parameter.

11. The method of claim 10, wherein the compiling of the program code is performed by an application programming interface (API).

12. The method of claim 11, where the API comprises one of a OpenGL for Embedded Systems API, an OpenCL API, or a WebGL API.

13. The method of claim 1, wherein the input parameter comprises a time of day, and wherein the sensory feedback is altered in response to the time of the day.

14. The method of claim 1, wherein the input parameter comprises motion, and wherein the sensory feedback is altered in response to the magnitude of motion.

15. A non-transitory computer-readable memory including computer executable instructions, the computer executable instructions, which when executed by a processor, cause an apparatus to perform a method as claimed in claim 1.

16. An apparatus, comprising:
    at least one processor; and
    at least one memory including computer program code, the at least one memory and the computer program code configured to, with the at least one processor, cause the apparatus to perform at least the following:
    detect a memory tag embedded within an object;
    detect at least one input parameter, wherein the at least one input parameter comprises at least one of motion or a time of day;
    load program code and at least one sensory parameter from the memory tag, wherein the at least one sensory parameter comprises at least one of a haptic-related program parameter or an olfactory-related program parameter; and
    generate sensory feedback in accordance with the loaded program code, the at least one sensory parameter, and the at least one input parameter, wherein the sensory feedback reflects content of the object.

17. The apparatus of claim 16, wherein the memory tag comprises a near field communication tag.

18. The apparatus of claim 16, wherein the at least one sensory parameter further comprises an auditory-related program parameter.

19. A method, comprising:
    receiving at a near field communication tag, at least one input parameter, wherein the at least one input parameter comprises at least one of motion or a time of day;
    receiving at the near field communication tag at least one sensory feedback parameter, wherein the at least one sensory feedback parameter comprises at least one of a haptic-related program parameter or an olfactory-related program parameter; and
    storing, in a compressed format, the at least one input parameter and the at least one sensory feedback parameter in conjunction with a program code, the program code being configured to, upon execution by a device separate from the near field communication tag, output sensory feedback based on the at least one input parameter and the at least one sensory feedback parameter.

20. The method of claim 19, wherein the near field communication tag is embedded within an object, and wherein the output sensory feedback is reflective of content of the object.

21. The method of claim 19, wherein the at least one sensory feedback parameter further comprises an auditory-related parameter.

22. The method of claim 20, wherein the outputting of the sensory feedback occurs at an electronic device that is one of touching or in close proximity to the object.

23. A non-transitory computer-readable memory including computer executable instructions, the computer executable instructions, which when executed by a processor, cause an apparatus to perform a method as claimed in claim 19.

24. An apparatus, comprising:
at least one processor; and
at least one memory including computer program code, the at least one memory and the computer program code configured to, with the at least one processor, cause the apparatus to perform at least the following:
receive at a near field communication tag at least one input parameter, wherein the at least one input parameter comprises at least one of motion or a time of day;
receive at the near field communication tag at least one sensory feedback parameter, wherein the at least one sensory feedback parameter comprises at least one of a haptic-related program parameter or an olfactory-related program parameter; and
store, in a compressed format, the at least one input parameter and the at least one sensory feedback parameter in conjunction with a program code, the program code being configured to, upon execution by a device separate from the near field communication tag, output sensory feedback based on the at least one input parameter and the at least one sensory feedback parameter.

25. The apparatus of claim 24, wherein the at least one sensory feedback parameter further comprises an auditory-related parameter.

26. The apparatus of claim 24, wherein the outputting of the sensory feedback occurs at the device separate from the apparatus that is one of touching or in close proximity to an object, the object being embedded with the apparatus.

* * * * *